(12) United States Patent
Rathay et al.

(10) Patent No.: US 10,807,703 B2
(45) Date of Patent: Oct. 20, 2020

(54) CONTROL SYSTEM FOR AN AIRCRAFT

(71) Applicant: General Electric Company, Schenectady, NY (US)

(72) Inventors: Nicholas William Rathay, Rock City Falls, NY (US); Narendra Digamber Joshi, Schenectady, NY (US)

(73) Assignee: General Electric Company, Schnectady, NY (US)

( * ) Notice: Subject to any disclaimer, the term of this patent is extended or adjusted under 35 U.S.C. 154(b) by 245 days.

(21) Appl. No.: 16/039,621

(22) Filed: Jul. 19, 2018

(65) Prior Publication Data

US 2020/0025216 A1 Jan. 23, 2020

(51) Int. Cl.
*B64C 19/00* (2006.01)
*F04D 29/68* (2006.01)
*B64C 23/00* (2006.01)
*B64C 30/00* (2006.01)

(52) U.S. Cl.
CPC ............ *B64C 19/00* (2013.01); *B64C 23/005* (2013.01); *B64C 30/00* (2013.01); *F04D 29/687* (2013.01); *B64C 2230/12* (2013.01); *F05D 2270/172* (2013.01)

(58) Field of Classification Search
CPC . B64C 23/005; B64C 2230/12; F15D 1/0075; F02K 1/002; F02K 1/008; F02K 1/28; F02K 1/30; F02K 3/10; F02K 7/12; F02K 7/14
See application file for complete search history.

(56) References Cited

U.S. PATENT DOCUMENTS

| | | | | | |
|---|---|---|---|---|---|
| 3,010,280 | A | * | 11/1961 | Hausmann | F02K 9/82 60/242 |
| 3,132,476 | A | * | 5/1964 | Conrad | F02K 9/82 239/265.17 |
| 3,134,561 | A | * | 5/1964 | Clejan | B64C 23/005 244/58 |
| 3,603,094 | A | * | 9/1971 | Townend | F02K 1/28 60/761 |
| 5,752,381 | A | * | 5/1998 | Speller | F02K 1/008 239/265.19 |
| 6,336,319 | B1 | * | 1/2002 | Koshoffer | F02K 1/002 239/265.17 |
| 7,571,598 | B2 | * | 8/2009 | O'Brien | F02K 3/10 60/39.826 |
| 7,669,404 | B2 | | 3/2010 | Samimy et al. | |
| 7,984,614 | B2 | | 7/2011 | Nolcheff | |
| 8,087,606 | B2 | * | 1/2012 | Brook | B64C 23/005 244/1 R |
| 8,096,104 | B2 | * | 1/2012 | Gilbert | F02K 1/822 60/231 |
| 8,316,631 | B2 | * | 11/2012 | Miller | F02K 1/30 60/204 |
| 8,371,104 | B2 | | 2/2013 | Wells et al. | |
| 8,382,043 | B1 | | 2/2013 | Raghu | |
| 8,453,457 | B2 | | 6/2013 | Ginn et al. | |

(Continued)

*Primary Examiner* — Joseph W Sanderson
(74) *Attorney, Agent, or Firm* — Paul Diconza

(57) ABSTRACT

A combustion system includes at least one plasma actuator disposed along a substrate at a plasma location, and at least one fuel injector disposed along the substrate at an injection location. The fuel injector disperses fuel toward the plasma location. The plasma from plasma actuator ignites fuel from the fuel injector proximate the plasma location.

16 Claims, 11 Drawing Sheets

(56) References Cited

U.S. PATENT DOCUMENTS

| | | | |
|---|---|---|---|
| 8,480,350 B2* | 7/2013 | Winter | F02K 1/30 |
| | | | 415/1 |
| 8,708,651 B2 | 4/2014 | Greenblatt | |
| 9,074,613 B2* | 7/2015 | Bonnet | H05H 1/24 |
| 9,108,711 B2 | 8/2015 | Krueger | |
| 9,359,950 B2 | 6/2016 | Matwey | |
| 9,551,296 B2* | 1/2017 | Winkler | F02K 1/002 |
| 9,746,010 B2* | 8/2017 | Roy | F15D 1/0075 |
| 2003/0005701 A1* | 1/2003 | Bulman | F02K 9/97 |
| | | | 60/761 |
| 2007/0044449 A1* | 3/2007 | O'Brien | F02K 7/10 |
| | | | 60/39.826 |
| 2009/0317249 A1* | 12/2009 | Brook | B63H 19/00 |
| | | | 416/1 |
| 2010/0068039 A1* | 3/2010 | Winter | F02C 7/36 |
| | | | 415/145 |
| 2012/0079803 A1* | 4/2012 | Miller | F02K 1/34 |
| | | | 60/205 |
| 2012/0145808 A1* | 6/2012 | Winkler | F02K 1/30 |
| | | | 239/265.35 |
| 2013/0032218 A1* | 2/2013 | Bonnet | H05H 1/24 |
| | | | 137/2 |
| 2013/0180245 A1 | 7/2013 | Saddoughi et al. | |
| 2016/0007436 A1* | 1/2016 | Roy | B64C 23/005 |
| | | | 315/111.41 |
| 2016/0280385 A1* | 9/2016 | Kupratis | F02K 3/11 |
| 2018/0286635 A1* | 10/2018 | Zimmerman | H05H 1/50 |
| 2019/0186747 A1* | 6/2019 | Lowery | F02C 7/266 |
| 2019/0360353 A1* | 11/2019 | Conners | F01D 17/14 |
| 2020/0023942 A1* | 1/2020 | Rathay | B64C 23/005 |

* cited by examiner

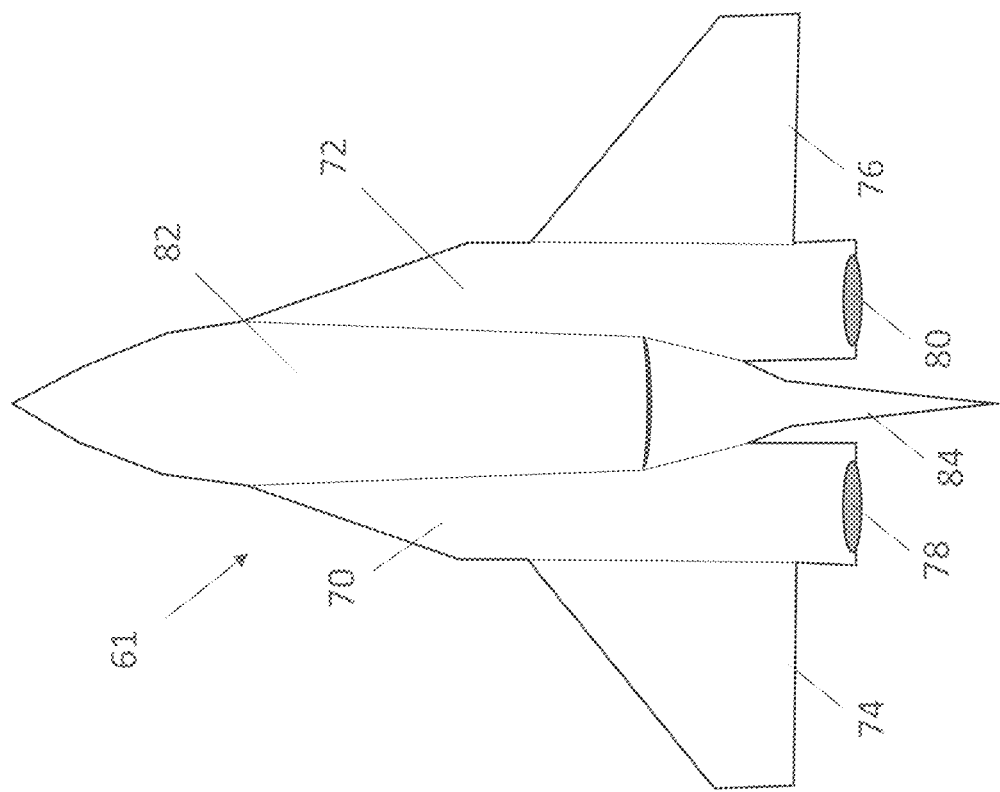

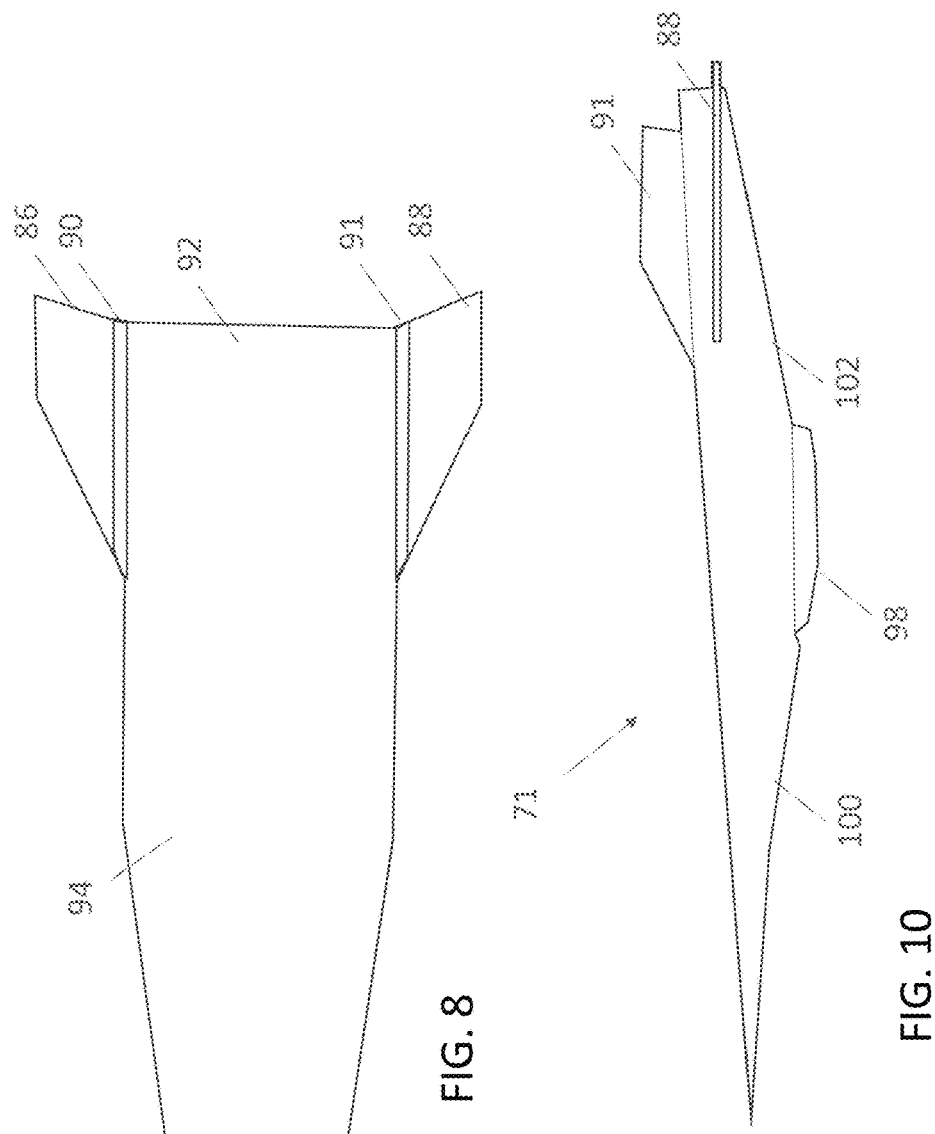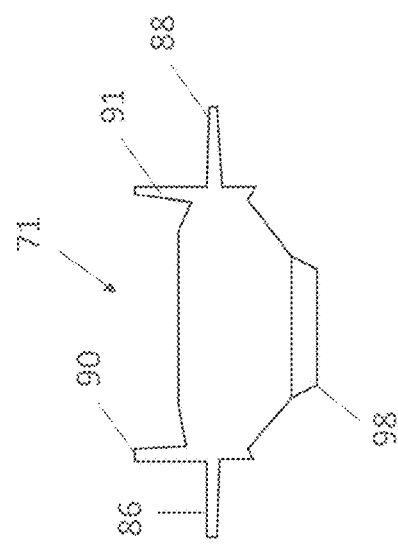

ns to aircraft and
methods of controlling aircraft.

CONTROL SYSTEM FOR AN AIRCRAFT

BACKGROUND

The subject matter disclosed herein relates to aircraft and methods of controlling aircraft.

Supersonic and hypersonic aircraft typically use control surfaces as one means of control. Control surfaces are often controlled using actuators and other mechanisms for positioning the control surfaces.

Aircraft flight stability and control at supersonic and hypersonic speeds is a multi-faceted field that includes the balancing of several factors, in large part due to the speeds at which the aircraft is flying. At supersonic and hypersonic speeds, the aircraft is subjected to high frequency disturbances and may require quicker response rates than what can be achieved with conventional control surfaces (e.g., ailerons, elevators, and rudders). In addition, even at lower speeds, aircraft control surfaces (e.g., moveable supersonic engine exhaust nozzle) are quite heavy, which reduces aircraft efficiency.

BRIEF DESCRIPTION OF THE EMBODIMENTS

Aspects of the present embodiments are summarized below. These embodiments are not intended to limit the scope of the present claimed embodiments, but rather, these embodiments are intended only to provide a brief summary of possible forms of the embodiments. Furthermore, the embodiments may encompass a variety of forms that may be similar to or different from the embodiments set forth below, commensurate with the scope of the claims.

In one embodiment, a combustion system includes at least one plasma actuator disposed along a substrate at a plasma location, and at least one fuel injector disposed along the substrate at an injection location. The fuel injector disperses fuel toward the plasma location. The plasma from plasma actuator ignites fuel from the fuel injector proximate the plasma location.

In another embodiment, an aircraft includes at least one plasma actuator disposed along an aircraft control surface at a plasma location, and at least one fuel injector disposed along the substrate at an injection location. The fuel injector disperses fuel toward the plasma location. The plasma from plasma actuator ignites fuel from the fuel injector proximate the plasma location.

In another embodiment, an aircraft control system includes a control processing unit, an airspeed indicator communicatively coupled to the control processing unit, at least one plasma actuator communicatively coupled to the control processing unit, at least one fuel injector communicatively coupled to the control processing unit, and a plurality of aircraft sensors and parameters. The control processing unit adjusts the operation of the plasma actuator and the fuel injector based at least partially on the airspeed indicator or at least one of the plurality of aircraft sensors and parameters.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 7 is a top view of a supersonic aircraft including plasma-ignited combustion systems;

FIG. 8 is a top view of a hypersonic aircraft including plasma-ignited combustion systems;

FIG. 9 is a front view of a hypersonic aircraft including plasma-ignited combustion systems;

FIG. 10 is a side view of a hypersonic aircraft including plasma-ignited combustion systems;

Figure 1:
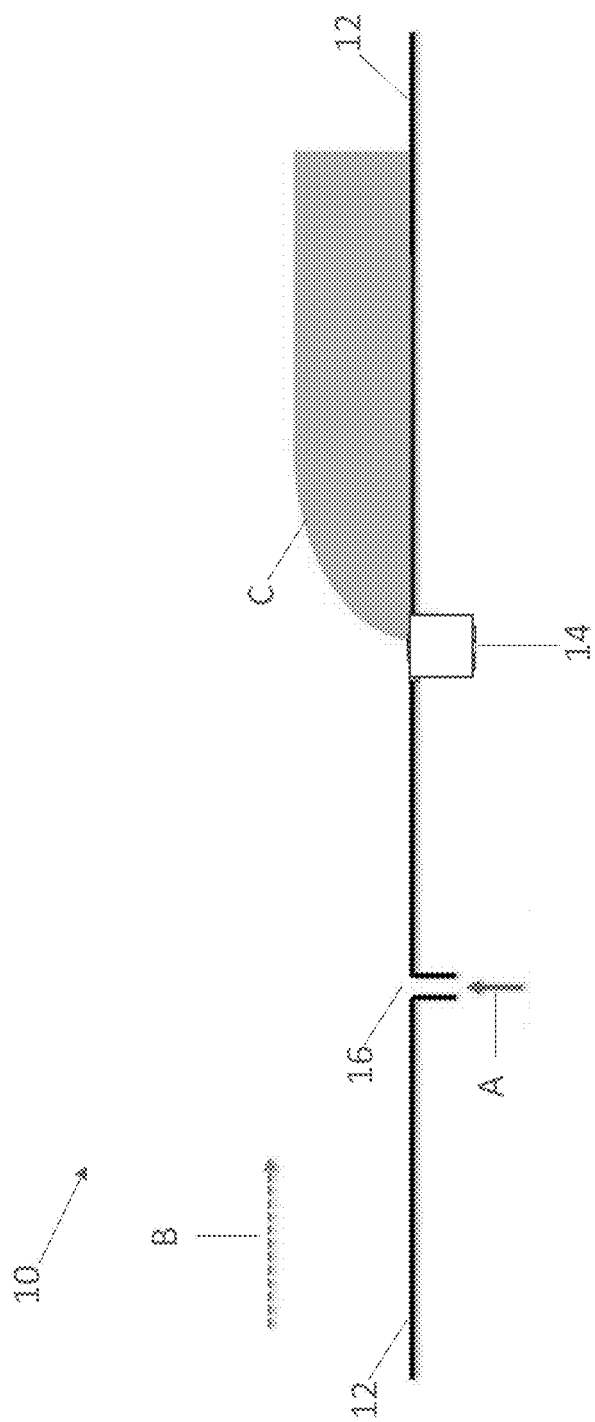
FIG. 1 is a side schematic representation of a plasma-ignited combustion system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "axial" refers to a direction aligned with a central axis or shaft of the gas turbine engine or alternatively the central axis of a propulsion engine and/or internal combustion engine. An axially forward end of the gas turbine engine is the end proximate the fan and/or compressor inlet where air enters the gas turbine engine. An axially aft end of the gas turbine engine is the end of the gas turbine proximate the engine exhaust where low pressure combustion gases exit the engine via the low pressure (LP) turbine. In non-turbine engines, axially aft is toward the exhaust and axially forward is toward the inlet.

As used herein, the term "circumferential" refers to a direction or directions around (and tangential to) the circumference of an annulus of a combustor, or for example the circle defined by the swept area of the turbine blades. As used herein, the terms "circumferential" and "tangential" are synonymous.

As used herein, the term "radial" refers to a direction moving outwardly away from the central axis of the gas turbine, or alternatively the central axis of a propulsion engine. A "radially inward" direction is aligned toward the central axis moving toward decreasing radii. A "radially outward" direction is aligned away from the central axis moving toward increasing radii.

As used herein, the term "plasma" refers to a gas that has been made electrically conductive by heating or subjecting it to electromagnetic fields, where long-range electromagnetic fields dominate the behavior of the matter.

As used herein, the term "cold plasma" refers to a plasma in which the characteristic temperature of the electrons is much higher than the characteristic temperature of the 'heavy' particles, namely the neutral and ionized molecules and atoms, rather than being in thermal equilibrium (i.e., a "thermal" plasma).

As used herein, the term "plasma actuator" refers to a plasma-generating device to create a plasma that acts to on a control surface of an aircraft, either in connection with fuel (plasma aided combustion) or without fuel (plasma-aided control). Plasma actuators can aid in stabilizing and/or enhancing combustion and can also create a plasma that acts on one or more control surfaces of an aircraft, as well as interacting with the aerodynamic conditions of an aircraft via flight. By way of example, a combustion flame can be spatially stabilized through use of swirl vanes or a bluff-body in the gas flow that creates a recirculation zone that stabilizes the location of a flame. An unsteady (time-varying) flame can be temporally stabilized by adjusting or modulating the fuel flow. A plasma can locally enhance combustion, stabilize the flame in a given location, and/or can be modulated to manage unsteady (time-varying) flame properties. A plasma can also be used to modify how a shockwave acts on a surface of an aircraft, for example, during supersonic flight.

As used herein, the term "ramjet" refers to an airbreathing jet engine that uses the engine's forward motion to compress incoming air without an axial compressor or a centrifugal compressor.

As used herein, the term "scramjet" refers to a variant of a ramjet airbreathing jet engine in which combustion takes place in supersonic airflow therein.

As used herein, the term "subsonic" refers to speeds of less than the speed of sound of less than about Mach 1. As used herein, the term "transonic" refers to speeds of about Mach 0.8 to about Mach 1.2. As used herein, the term "supersonic" refers to speeds greater than the speed of sound and more specifically, speeds of about Mach 1 to about Mach 5. As used herein, the term "hypersonic" refers to speeds of about Mach 5 and above.

Embodiments of the present disclosure may relate to subsonic, supersonic, and hypersonic aircraft employing plasma ignited combustion systems in concert with aircraft control surfaces. The embodiments disclosed herein account for the enhanced and simplified control of aircraft using control surfaces.

FIG. 1 illustrates a plasma-ignited combustion system 10 of the present embodiments using a control surface 12. The control surface 12 may be a substrate into which components of the claimed embodiments are disposed. In addition, fluid(s) may flow over the outer surface of the substrate or control surface 12. Fuel is injected at A through the control surface 12 into a gas stream, with gas flowing in a direction B. The combustion process is initiated by at least one plasma actuator 14 placed downstream of the injection location 16. The combustion occurs in a combustion zone C and creates a force on the control surface 12, which can be used for stability and control of an aircraft.

Several plasma actuator arrangements are possible. A 'microwave plasma' can be created by injecting microwave electric power into a gas (such as air or a fuel-air mixture), where the microwave electric power preferentially couples to gaseous regions that are already ionized and conducting, such as the flame front, thereby adding energy to the flame front and increasing the local heat-release rate.

Microwave plasma can also be created upstream of the flame zone, in either the air or the air-fuel mixture, where it can act as a source of plasma that generates reactive radicals that flow into and enhance the combustion process, without necessarily depositing energy into ordinary gas heating. The resulting plasma can either be cold or thermal. Gas can be introduced through the plasma into the combustion region (for example from the sidewall of the combustion chamber), a device that is sometimes referred to as a 'plasmatron.' The microwave frequency may be in a range from about 0.3 GHz to about 300 GHz.

The plasmatron plasma actuator can also be powered by other means such as radiofrequency induction (in a range from about 3 kHz to about 0.3 Ghz), or by electrodes driven by direct or alternating current. A hot jet emerges in the combustion chamber to stabilize and control the flame. Radiofrequency or microwave energy can be created by power electronics or a magnetron and conveyed to the desired region in the engine by a transmission line such as a coaxial cable or other suitably shaped structures like waveguides or 'applicators.'

A spark plasma can be created to stabilize flame in a manner similar to a diffusion pilot flame in a combustor, where the overall fuel-air ratio is lean (that is, where oxygen remains after complete combustion of the fuel). In this arrangement the plasma acts as localized heat source. Such a plasma can be created by an intermittent 'spark' plasma (for example, a spark plug igniter), or a continuous 'arc' plasma that is maintained between two electrodes by controlling the current that flows through the circuit. A spark plasma can also be achieved via an intermittent laser spark plasma or (a continuous laser arc plasma) that is created by focusing laser power into the gas volume.

A cold plasma can be maintained in a gas by controlling the power deposition so that energy does not transfer from the electrons to the heavy particles because either the pressure is low, the power density is low, or the energy is applied for a short time (pulsed). The resulting plasma generates reactive radicals that flow into and enhance the combustion process, without necessarily depositing energy into ordinary gas heating. A nanosecond plasma can also be configured with gas flow as a plasmatron.

Figure 2:
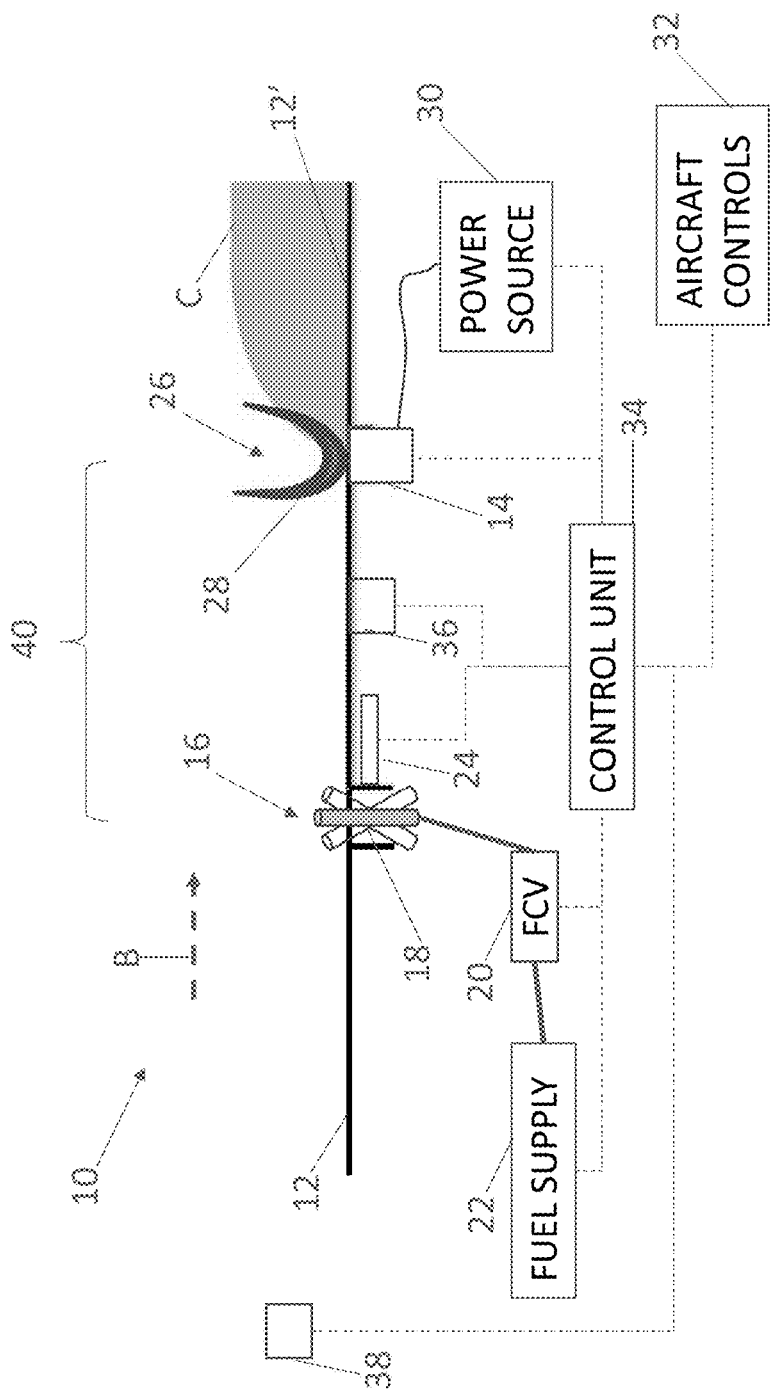
FIG. 2 is a side schematic representation of a plasma-ignited combustion system, with a schematic representation of a control system.

FIG. 2 illustrates a plasma-ignited combustion system 10 of the present embodiments using a control surface 12. Fuel is injected at injection location 16 through at least one fuel injector 18. The one or more fuel injector 18 is in fluid communication with a fuel control valve 20 which controls the amount of fuel flowing to the fuel injector 18. A fuel supply 22 is in fluid communication with and upstream of the fuel control valve 20. In some embodiments, a fuel injector articulator 24 may be mechanically coupled to the fuel injector 18 in order to adjust the angle at which fuel is dispersed from the fuel injector 18, as required depending on the ambient air flow and operating conditions of the aircraft. Fuel flows downstream across the control surface 12 toward a plasma location 26, proximate one or more plasma actuators 14. The plasma location 26 is downstream from the injection location 16, relative to an airflow direction B. The fuel is ignited and forms a combustion zone C adjacent a control surface downstream portion 12'.

Referring still to FIG. 2, the fuel injector(s) 18 and plasma actuator(s) 14 are disposed nearly flush to the control surface 12, limiting potential detrimental impacts, such as an increase in drag, when they are inactive. The plasma-ignited combustion system 10 may include a flow surface 28 in the vicinity of the plasma location 26. The flow surface 28 may be used to enhance the surface on which forces from the combustion zone C are acting. For example, in the embodiment of FIG. 2, the flow surface 28 may be a thin half nozzle or crescent moon shaped. In other embodiments, the flow surface 28 may semi-cylindrically (i.e., "half pipe") shaped, semi-spherical, or semi-elliptical, cone-shaped, semi-cone-shaped, truncated cone shaped, sinusoidal shaped, as well as other contoured shaped. In other embodiments, the flow surface 28 may be planar and may be inclined or angled, relative to the control surface 12. In other embodiments, the flow surface 28 may be piecewise planar, including multiple planar surfaces assembled from individual planar segments and arranged at various angles. In other embodiments, multiple flow surfaces 28 may be used. In other embodiments, a separate flow surface 28 may not be required. In other embodiments, the control surface 12 will be contoured or shaped to avoid needing a separate flow surface 28. The flow surface 28 may generally be open at one end and shaped at the end proximate the control surface 12. The flow surface 28 may enhance the transfer of forces resulting from the plasma-ignited combustion to the control surface 12.

Still referring to FIG. 2, the plasma-ignited combustion system 10 may include a power source 30 electrically coupled to the plasma actuator 14 for generating plasma. The plasma-ignited combustion system 10 may include a control processing unit 34. The control unit or control processing unit 34 may be communicatively coupled to each of the fuel supply 22, the fuel control valve 20, the fuel injector articulator 24, the plasma actuator 14 and the power source 30. The control unit 34 may also be communicatively coupled to the aircraft controls 32 as well as a local airspeed indicator 36 and/or an aircraft airspeed indicator 38. In the embodiment of FIG. 2, components that may be communicatively coupled to each other are connected via dashed lines. However, other communication couplings among components may also be possible.

Because generating plasma consumes energy, it is desirable to only produce plasma when needed. For example, in one embodiment, plasma will be generated such that it is present in the vicinity of the plasma location 26 just prior to the arrival of fuel from the injection location 16. Therefore, it may be desirable to time the fuel injection through the fuel injector 18 with the plasma generation through the plasma actuator 14 so as to minimize energy losses (via both fuel losses and unused plasma). The local airspeed indicator 36 may be used to approximate the time of flight of the fuel from the injection location 16 to the plasma location 26 since a first distance 40 between the injection location 16 and the plasma location 26 is likely fixed and therefore a known quantity. Because boundary layer and other fluid effects may be present in the vicinity of the control surface 12, and because these effects may vary with varying operating and environmental conditions, a local airspeed indicator 36 may be able to accurately determine how quickly the fuel will travel the first distance 40 between the injection location 16 and the plasma location 26, since the local airspeed indicator 36 is disposed at the control surface 12 downstream from the injection location 16 and upstream from the plasma location 26.

The local airspeed indicator 36 illustrated in FIG. 2 may be an ultrasonic sensor, or a calibrated static pressure type sensor used for approximating airflow. The local airspeed indicator 36 may also be other types of sensors including a pancake probe sensor, a pitot tube sensor, a differential pressure sensor and/or any other sensor that can be used to measure flow across a surface. Ultrasonic sensors may be able to differentiate between the speed of fuel and the speed of air flowing past in conditions where a difference in speeds exists between the two fluids. Other sensors that do not differentiate between the speed of fuel and the speed of air flowing past may still accurately predict the time of flight for the fuel to flow from the injection location 16 to upstream from the plasma location 26 by correlating the fuel speed to the air speed. The plasma-ignited combustion system 10 may also include an airflow indication 38 from a different location and/or from the aircraft control 32. As discussed above, the local airspeed indicator 36 may have the benefit of accounting for boundary layer conditions. However, in embodiments where the aircraft airspeed and the time of flight for the fuel to flow from the injection location 16 to upstream from the plasma location 26 are highly correlated, an airflow indication 38 from the aircraft controls 32 may be sufficient. In flight conditions when the direction of airflow is not aligned with a line connecting the injection location 16 to the plasma location 26 (for example due to the formation of transverse boundary layers and/or other aerodynamic effects or aircraft maneuvers), the orientation of the fuel injector 18 may be adjusted by the fuel injector articulator 24 to ensure the fuel dispersed by the fuel injector 18 reaches the plasma location 26. In addition, guides, tubes, vanes and/or other devices (not shown) may be employed to direct the fuel dispersed by the fuel injector 18 to the plasma location 26.

Figure 3:
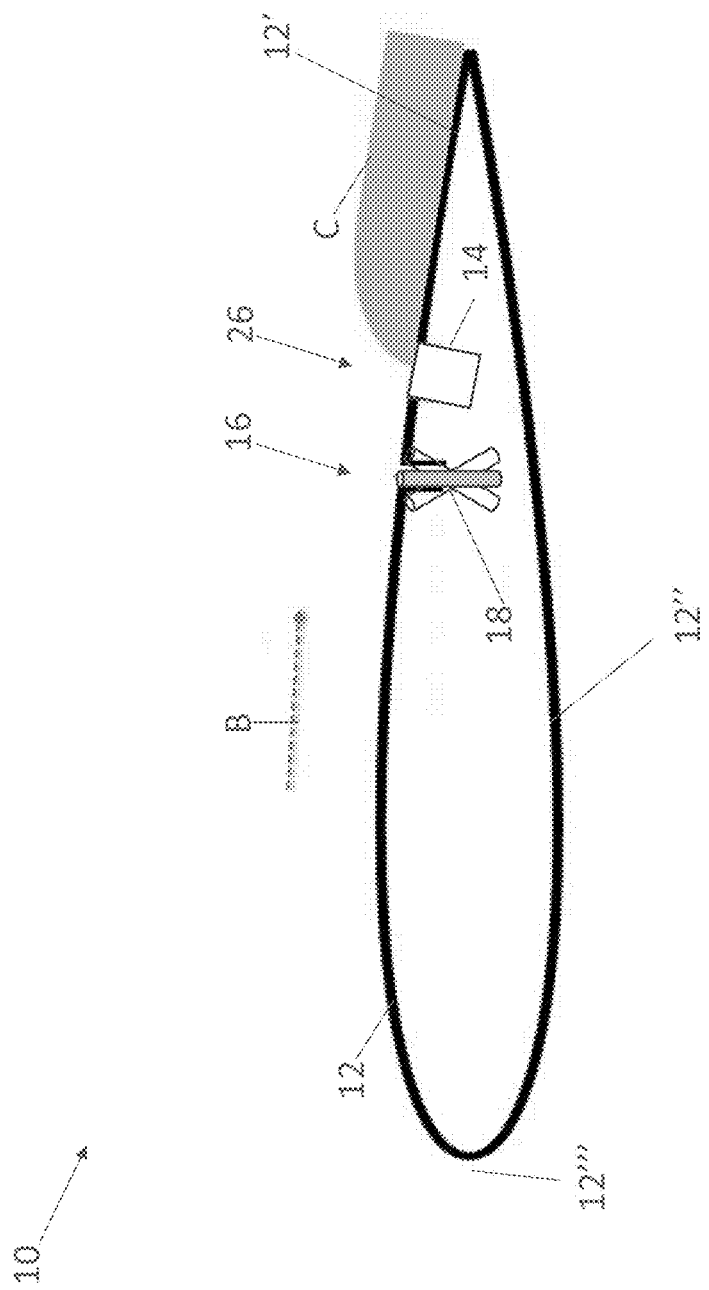
FIG. 3 is a side schematic representation of a wing-mounted plasma-ignited combustion system.

FIG. 3 illustrates an embodiment of the plasma-ignited combustion system 10 on an airfoil-shaped control surface 12. The airfoil-shaped control surface 12 illustrated in FIG. 3 could be the wing of an aircraft, other airfoil-shaped structures on an aircraft, an airfoil-shaped aircraft as well as other surfaces that are used as control surfaces 12. The embodiment of FIG. 3 includes fuel injected via at least one fuel injector 18 at an injection location 16 upstream of a plasma location 26 where plasma is generated via at least one plasma actuator 14. The at least one plasma actuator 14 ignites the fuel resulting in combustion zone C at a control surface downstream end 12'. Air flows across the control surface 12 in a direction B. The embodiment of FIG. 3 may also include the several other system components of FIG. 2 including but not limited to the power source 30, the local airspeed sensor 36, the flow surface 28, the fuel supply 22, the fuel control valve 20, the control processing unit 34, the aircraft control 32, the aircraft airspeed indicator 38, and the fuel injector articulator 24. In other embodiments, the components of the plasma-ignited combustion system 10 will be disposed on a control surface under side 12" instead of or in addition to on the top side of the control surface 12. In other embodiments, the components of the plasma-ignited combustion system 10 will be disposed in the vicinity of the control surface upstream end 12''' instead of or in addition to on the control surface top surface 12 and/or on the control surface under side 12".

Figure 4:
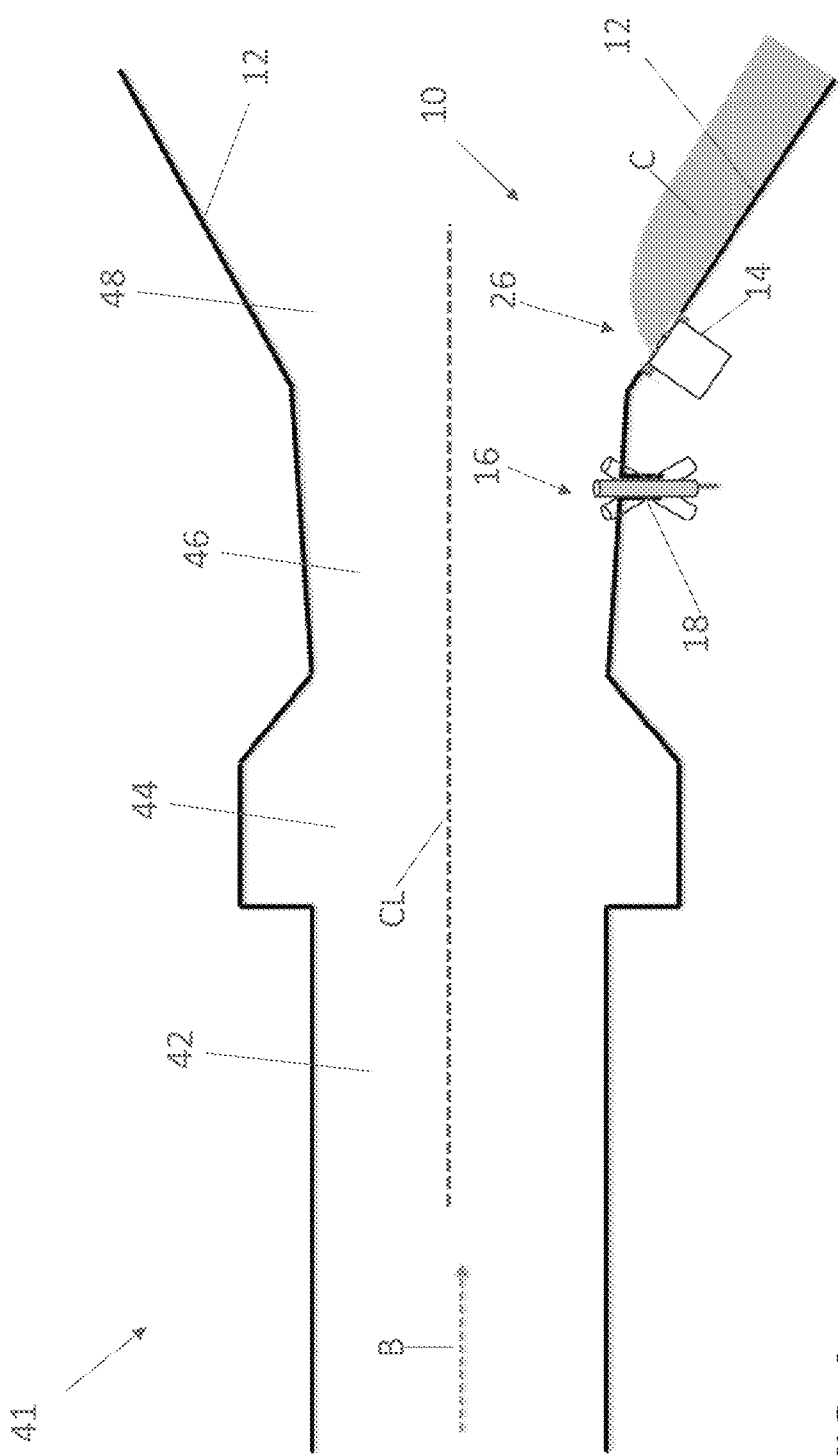
FIG. 4 is a side schematic representation of an engine-mounted plasma-ignited combustion system.

FIG. 4 illustrates an embodiment of the plasma-ignited combustion system 10 in a supersonic combustion engine 41 application. The supersonic combustion engine 41 illustrated in FIG. 4 may include an air-tube inlet 42 feeding a main combustor portion 44 upstream from a diverging portion 46, upstream from a flared exhaust portion 48. The supersonic combustion engine 41 may be generally axisymmetric about an engine centerline CL. The flared exhaust portion 48 may include one or more control surfaces 12 that form an annular exhaust and diverge radially outward form the engine centerline CL as they extend aft in direction B. The embodiment of FIG. 4 includes fuel injected via at least one fuel injection 18 at an injection location 16 upstream of a plasma location 26 where plasma is generated via at least one plasma actuator 14. The at least one plasma actuator 14 ignites the fuel resulting in combustion zone C at a control surface 12. The embodiment of FIG. 4 may also include the several other system components of FIG. 2 including, but not limited to, the power source 30, the flow surface 28, the local airspeed sensor 36, the fuel supply 22, the fuel control valve 20, the control unit 34, the aircraft controls 32, the aircraft airspeed indicator 38, and the fuel injector articulator 24. In other embodiments, the components of the plasma-ignited combustion system 10 will be disposed around an annular exhaust at various orientations so as to allow force vectors to be applied to the control surfaces 12 at different angles, as needed to control the aircraft. The embodiment of FIG. 4 may reduce system complexity since fuel delivery and handling systems may already be in place due to fuel burned at the main combustor portion 44. In addition, by using surfaces in an engine exhaust system or exhaust nozzle as control surfaces in concert with plasma-ignited combustion, it may be possible to extract thrust from the plasma-ignited combustion, thereby augmenting the thrust from the supersonic combustion engine 41, and/or reducing the flow of fuel required by the main combustor portion 44. Arrangements of the present embodiments similar to that of FIG. 4 are also possible in subsonic combustion and/or conventional gas turbine aircraft engine configurations.

Figure 5:
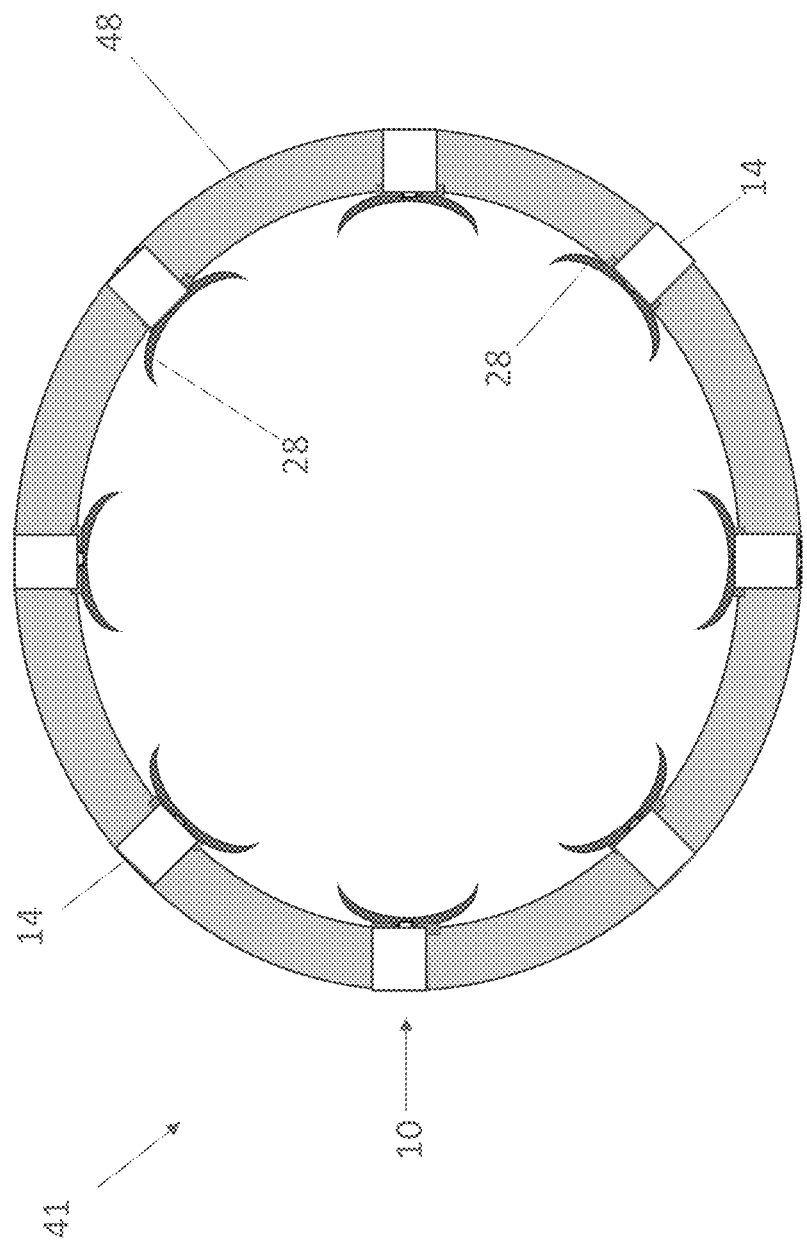
FIG. 5 is an aft-looking-forward view of an engine exhaust annulus including plasma-ignited combustion systems.

FIG. 5 illustrates an aft-looking-forward embodiment of the plasma-ignited combustion system 10 in a supersonic combustion engine 41 application, similar to that of FIG. 4. In other embodiments, the plasma-ignited combustion system 10 could be in a gas turbine engine or other subsonic engine. The embodiment of FIG. 5 is viewed from the back end of the supersonic combustion engine 41, through the flared exhaust portion 48. A plurality of plasma-ignited combustion systems 10 are circumferentially spaced around the exhaust annulus of the supersonic combustion engine 41. In the embodiment of FIG. 5, the plurality of plasma-ignited combustion systems 10 each include a plasma actuator 14, a flow surface 28 and the other system components shown in FIG. 2, including but not limited to the power source 30, the local airspeed sensor 36, the fuel supply 22, the fuel control valve 20, the control processing unit 34, aircraft control 32, the aircraft airspeed indicator 38, and the fuel injector articulator 24. The embodiment of FIG. 5 includes 8 plasma-ignited combustion systems 10 space approximately evenly around the annulus of the supersonic combustion engine 41 at intervals of about 45 degrees. In other embodiments, other numbers of plasma-ignited combustion systems 10 and other spacing arrangements may be used. In addition, flow surfaces 28 may not be needed due to the curvature of the engine annulus and/or a different number of flow surfaces 28 may be used than the number of plasma actuators 14. By asymmetrically operating the plasma-ignited combustion systems 10, net forces in any desired direction may be possible. The forces may act on control surfaces 12 within the engine. In other embodiments, the forces may act on surfaces within the engine, which in turn may act on control surfaces 12 of the aircraft.

Figure 6:
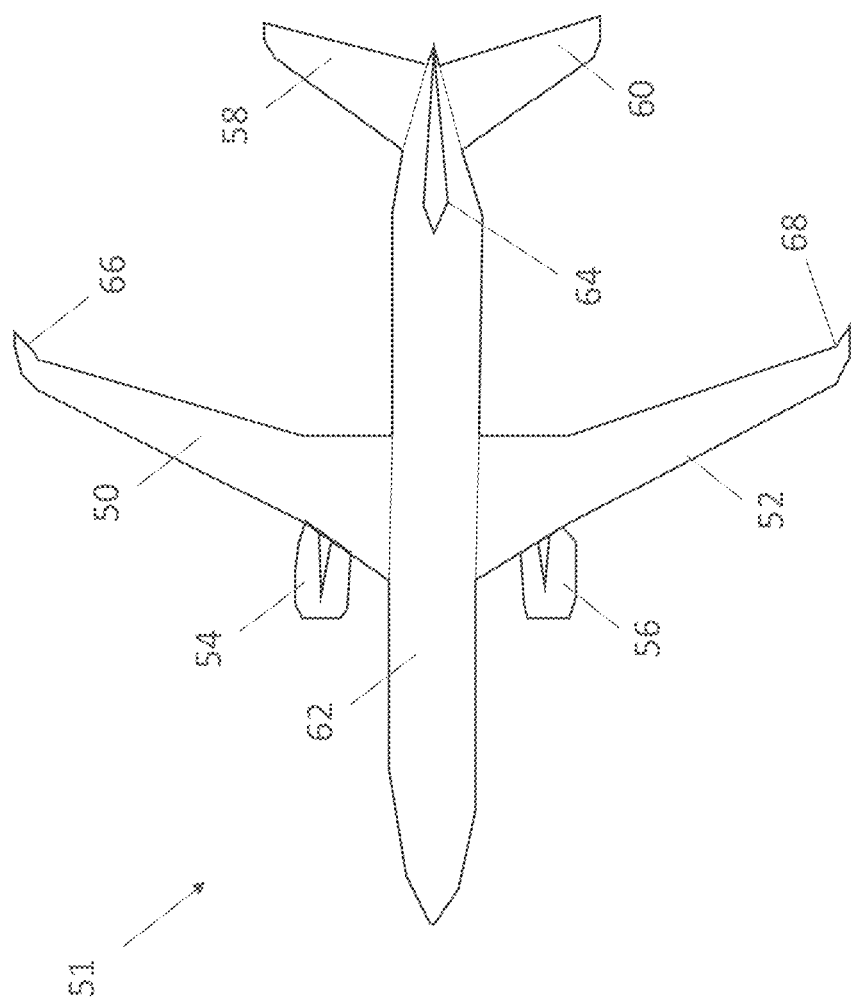
FIG. 6 is a top view of a subsonic aircraft including plasma-ignited combustion systems.

FIG. 6 illustrates a top view of an exemplary subsonic aircraft 51. The plasma-ignited combustion systems 10 (not shown) of the present embodiments may be used in subsonic aircraft 51 applications. For example, the plasma-ignited combustion systems 10 may be disposed on surfaces of the subsonic aircraft 51 including, but not limited to, a right wing 50, a left wing 52, a right engine nacelle 54, a left engine nacelle 56, a right horizontal stabilizer 58, a left horizontal stabilizer 60, an aircraft fuselage 62, a vertical stabilizer 64 (left side and/or right side), a right winglet 66, and/or a left winglet 68. In addition, the plasma-ignited combustion systems 10 may be disposed on corresponding surfaces to those mentioned above (as well as other surfaces) on the underside of the subsonic aircraft 51.

FIG. 7 illustrates a top view of an exemplary supersonic aircraft 61. The plasma-ignited combustion systems 10 (not shown) of the present embodiments may be used in supersonic aircraft 61 applications. For example, the plasma-ignited combustion systems 10 may be disposed on surfaces of the supersonic aircraft 61 including, but not limited to, a left control surface 70, a right control surface 72, a left wing 74, a right wing 76, a left engine 78, a right engine 80, a central aircraft body portion 82, and a tail portion 84. In addition, the plasma-ignited combustion systems 10 may be disposed on corresponding surfaces to those mentioned above (as well as other surfaces) on the underside of the supersonic aircraft 61.

FIG. 8 illustrates a top view of an exemplary hypersonic aircraft 71. The plasma-ignited combustion systems 10 (not shown) of the present embodiments may be used in hypersonic aircraft 71 applications. For example, the plasma-ignited combustion systems 10 may be disposed on surfaces of the first hypersonic aircraft 71 including, but not limited to, a right horizontal surface 86, a left horizontal surface 88, a right vertical surface 90 (outer right side and/or inner left side), a left vertical surface 91 (outer left side and/or inner right side), an aircraft body rear portion 92, an aircraft body mid portion 94, and an aircraft body front portion 96. In addition, the plasma-ignited combustion systems 10 may be disposed on corresponding surfaces to those mentioned above (as well as other surfaces) on the underside of the first hypersonic aircraft 71.

FIG. 9 illustrates a front view of hypersonic aircraft 71, including an air inlet 98 disposed on the underside of the first hypersonic aircraft 71. The plasma-ignited combustion systems 10 (not shown) of the present embodiments may be used in first hypersonic aircraft 71 applications. For example, the plasma-ignited combustion systems 10 may be disposed on surfaces of the first hypersonic aircraft 71 including, but not limited to, a right horizontal surface 86, a left horizontal surface 88, a right vertical surface 90 (either and/or both sides), and a left vertical surface 91 (either and/or both sides).

FIG. 10 illustrates a side view of first hypersonic aircraft 71, including an air inlet 98 disposed on the underside of the first hypersonic aircraft 71. The plasma-ignited combustion systems 10 (not shown) of the present embodiments may be used in first hypersonic aircraft 71 applications. For example, the plasma-ignited combustion systems 10 may be disposed on surfaces of the first hypersonic aircraft 71 including, but not limited to, a left horizontal surface 88, a left vertical surface 91 (either and/or both sides), an underside upstream portion 100, and an underside downstream portion 102. The air inlet 98 is disposed between the underside upstream portion 100, and the underside downstream portion 102.

Figure 11:
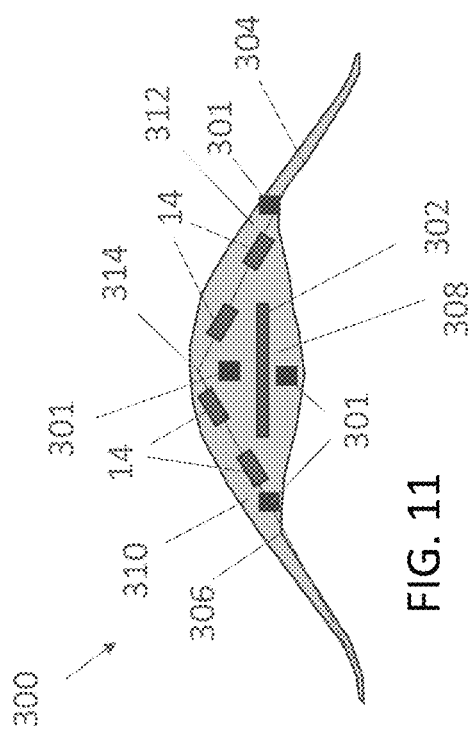
FIG. 11 is a front view of a hypersonic aircraft including plasma-aided control systems.

FIG. 11 illustrates a front view of a second hypersonic aircraft 300 having a different configuration than the first hypersonic aircraft 71. The second hypersonic aircraft 300 includes a left leading edge 304 defining the forward edge of a left aircraft wing 312. The left leading edge 304 may extend forward to an aircraft nose 314 where the left leading edge 304 may converge with a right leading edge 306 which defines the forward edge of the aircraft right wing 310. The second hypersonic aircraft 300 may include an inlet 302 disposed on an aircraft underside 308. A plurality of plasma actuators 14 may be disposed along each of the left leading edge 304 and the right leading edge 306. The plurality of plasma actuators 14 may be flush with the leading edges 304, 306 such that they do not extend or protrude from the aircraft into the oncoming airstream. In addition, the plurality of plasma actuators 14 may be disposed at the leading edges 304, 306 or alternatively in the vicinity of the leading edges 304, 306 such that they are positioned to generate plasma at the leading edges 304, 306 where shockwaves are most likely to be present. Stated otherwise, the plurality of plasma actuators 14 do not need to be disposed exactly at the leading edges 304, 306, as long as they are close enough to cause plasma generation at the leading edges 304, 306. For example, in one embodiment the plurality of plasma actuators 14 may be located within about 5% of an aircraft length of at least one of the leading edges 304, 306, the aircraft length being defined by the length of the aircraft body apex line 316.

In operation, as the second hypersonic aircraft 300 reaches supersonic and/or hypersonic speeds, shockwaves may propagate along the aircraft underside 308, along the top and bottom of the right and left wings 310, 312 as well as along other surfaces of the second hypersonic aircraft 300. The shockwaves (not shown) may provide lift and/or act with force on the various surfaces of the second hypersonic aircraft 300 requiring a restorative or counteractive controlling force so as to stably control the second hypersonic aircraft 300. As such, the plasma actuators 14 may be used to generate plasma along each of the left leading edge 304 and the right leading edge 306 between the aircraft and shockwave. This may cause the effective shockwave propagation angle to chance. In addition, this may also alter the propagation area to relocate downstream toward an aft end (not shown) of the aircraft. Similarly, using the plasma actuators 14 to generate plasma between the aircraft and shockwave may buffer the aircraft from the shockwave, modify the shockwave angle, and/or change the forces acting on control surfaces 12 of the aircraft.

Still referring to FIG. 11, the second hypersonic aircraft 300 may include one or more flight stability sensors 301 disposed on the aircraft underside 308. The one or more flight stability sensors 301 may be used for sensing at least one aerodynamic characteristic of the second hypersonic aircraft 300 at a given operating condition. For example, the one or more flight stability sensors 301 may consist of airspeed indicators indicating when supersonic flight conditions, and thus the presence of shockwaves, are apparent.

In another embodiment, the one or more flight stability sensors 301 may include static pressure sensors, indicating the presence and/or magnitude of a shockwave, as well as the frequency at which shockwaves are propagating along the aircraft underside 308 and/or left and right leading edges 304, 306. The one or more flight stability sensors 301 may also be disposed along the left and right leading edges 304, 306, where shockwaves are most likely to form and/or act with force upon.

Referring still to FIG. 11, the one or more flight stability sensors 301 may be used by an aircraft control system to govern the frequency and/or magnitude at which the plasma actuators 14 generate plasma. For example, in conditions where the magnitude of the shockwaves is proportional to an aircraft airspeed, the one or more flight stability sensors 301 may be used as static pressure sensors for measuring the magnitude of the shockwaves, and thus an approximation for airspeed. Similarly, the one or more flight stability sensors 301 may be used to sense the shockwave frequency which may be used by an aircraft control system to govern a counteracting and/or stabilizing activation of at least one plasma actuator 14. The frequency of the shockwaves may be determined using a single flight stability sensor 301 by measuring the frequency at which pressure waves cause pulses that are sensed by the single flight stability sensor 301. In other embodiments, the frequency of the shockwaves may be determined using multiple flight stability sensors 301 positioned at multiple locations on the aircraft which sense the time of flight a single shockwave takes to propagate from a first flight stability sensor 301 to a second flight stability sensor 301.

Figure 12:
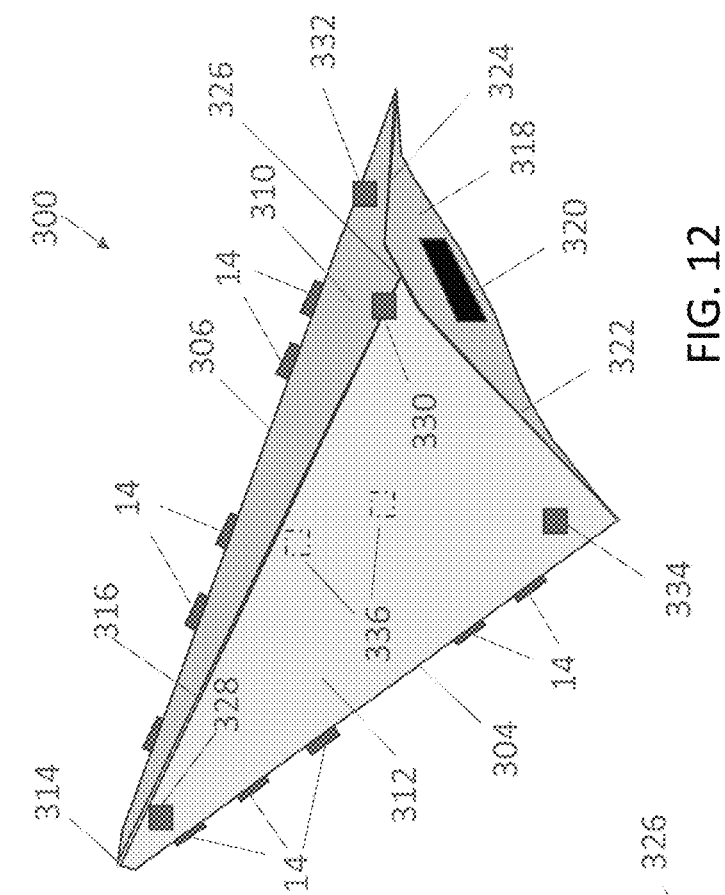
FIG. 12 is a perspective view of a hypersonic aircraft including plasma-aided control systems.

FIG. 12 illustrates a perspective view of the second hypersonic aircraft 300 including the left wing 312, the right wing 310, the left leading edge 304, the right leading edge 306, the aircraft nose 314, and the plurality of plasma actuators 14 disposed along the left and right leading edges 304, 306. The second hypersonic aircraft 300 also may include an aircraft body apex line 316 extending the length of the aircraft. The aircraft body apex line 316 may define the intersection between the right wing 310 and the left wing 312. The aircraft body apex line 316 may be defined by a single line or alternatively, may be a curved and/or slightly smoothed or round portion of the top of the second hypersonic aircraft 300 where the left and right wings 312, 310 meet or intersect. The second hypersonic aircraft 300 also includes an aft end 318 defined by a left trailing edge 322 and a right trailing edge 324 which also define the aft edges of the left wing and the right wing 310, 312. An aircraft exhaust 320 may also be disposed in the aft end 318. An aircraft apex 326 defines the intersection of the left wing, 312, the right wing 310 and the aft end 318. The left and right leading edges 304, 306, at an intersection point which may be on or in front of the aircraft, may for a sharp angle. For example, in one embodiment, the left and right leading edges 304, 306 form an angle less than about 60 degrees. In another embodiment, the left and right leading edges 304, 306 form an angle between about 5 degrees and about 45 degrees. In another embodiment, the left and right leading edges 304, 306 form an angle between about 9 degrees and about 35 degrees. In another embodiment, the left and right leading edges 304, 306 form an angle between about 15 degrees and about 25 degrees. In another embodiment, the left and right leading edges 304, 306 form an angle between about 17 degrees and about 23 degrees.

Still referring to FIG. 12, the second hypersonic aircraft 300 may include a first sensor 328 disposed at or near the aircraft nose 314, a second sensor 330 disposed at or near the aircraft apex 326 (i.e., centrally located on the top surface of the aircraft proximate the aft end of the aircraft), a third sensor 332 disposed on the right wing 310 near the aft end 318, and a fourth sensor 334 disposed on the left wing 312 near the aft end 318. The second hypersonic aircraft 300 may also include other sensors 336 at other locations including corresponding locations on the bottom surface of the aircraft. The sensors 328, 330, 332, 334, 336 may be used to establish the various orientations and frames of reference of the aircraft during flight. For example, the sensors 328, 330, 332, 334, 336 may be used to establish an aircraft angle of attack 116, an aircraft yaw 126, an aircraft angular acceleration 130, an aircraft vertical acceleration 132, aircraft vibrations, an aircraft attitude 120, an aircraft altitude 122 as well as other parameters. Each of the sensors 328, 330, 332, 334, 336 may be gyroscopes, GPS sensors, accelerometers, Lidar, proximity sensors, communication devices for establishing position relative to a frame of reference other than a satellite, barometers, navigation compasses, quantum gyroscopes, MEMS gyroscopes, fiber optic gyroscopes, gyrocompasses, heading indicators, gyrostats, Foucault pendulums, hemispherical resonator gyroscopes, vibrating structure gyroscopes, dynamically tuned gyroscopes (DTG), ring laser gyroscopes, London moment gyroscopes, optical accelerometers as well as other types of sensors. In one embodiment, the first sensor 328 will be located within about 10% of an aircraft length of the aircraft nose 314, the aircraft length being defined by the length of the aircraft body apex line 316. In another embodiment, the first sensor 328 will be located within about 5% of an aircraft length of the aircraft nose 314, the aircraft length being defined by the length of the aircraft body apex line 316. In another embodiment, the second sensor 330 will be located within about 10% of an aircraft length of the aircraft aft end 318, the aircraft length being defined by the length of the aircraft body apex line 316. In another embodiment, the second sensor 330 will be located within about 5% of an aircraft length of the aircraft aft end 318, the aircraft length being defined by the length of the aircraft body apex line 316.

Referring still to FIG. 12, each of the sensors 328, 330, 332, 334, 336 may be used individually or in concert with each other to establish at least one aspect of an aircraft orientation. The sensors 328, 330, 332, 334, 336 may be tuned such that they operate on a frequency range of 1 kHz to 5 MHz, generating 1000s to millions of orientation signals per second. The orientation signals from the sensors 328, 330, 332, 334, 336 may be used by an aircraft control system to adjust the orientation of the aircraft via the plurality of plasma actuators 14. By activating the plasma actuators 14 asymmetrically, the aircraft control system may cause a net force to act on the aircraft resulting in a desired target orientation of the aircraft. For example, by activating more plasma actuators 14 along the left leading edge 304 than the right leading edge 306, the control system may cause a net force on the aircraft that results in a change or adjustment to the aircraft yaw 126 (not shown), or a rolling force on the aircraft 300. Similarly, by activating more plasma actuators 14 at or near the aircraft nose 314 than at or near the aircraft aft end 318, the control system may cause a net force on the aircraft that results in a change or adjustment to the aircraft angle of attack 116 (not shown).

Figure 13:
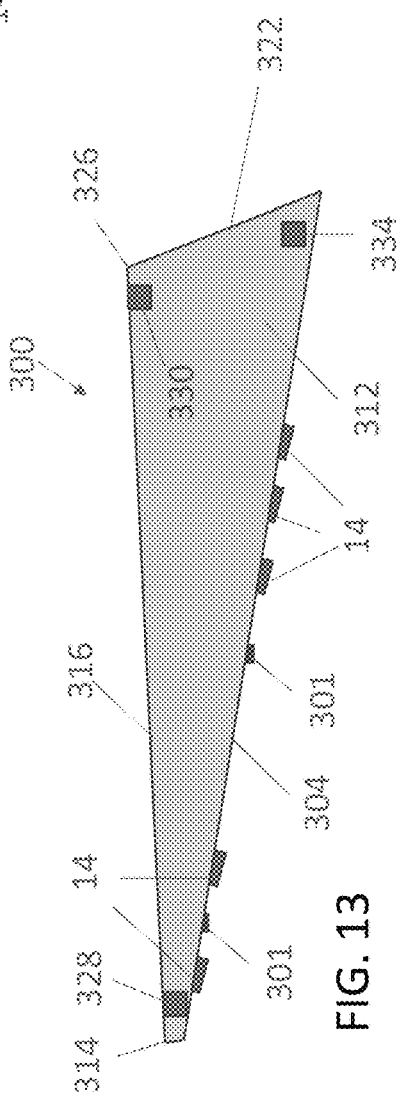
FIG. 13 is a side view of a hypersonic aircraft including plasma-aided control systems.

FIG. 13 illustrates a side view of a second hypersonic aircraft 300 including the left wing 312, the left leading edge 304, the aircraft nose 314, the aircraft body apex line 316, the left trailing edge 322, aircraft apex 326, the plurality of plasma actuators 14, the one or more flight stability sensors 301 and the plurality of aircraft orientation sensors 328, 330, 334.

Figure 14:
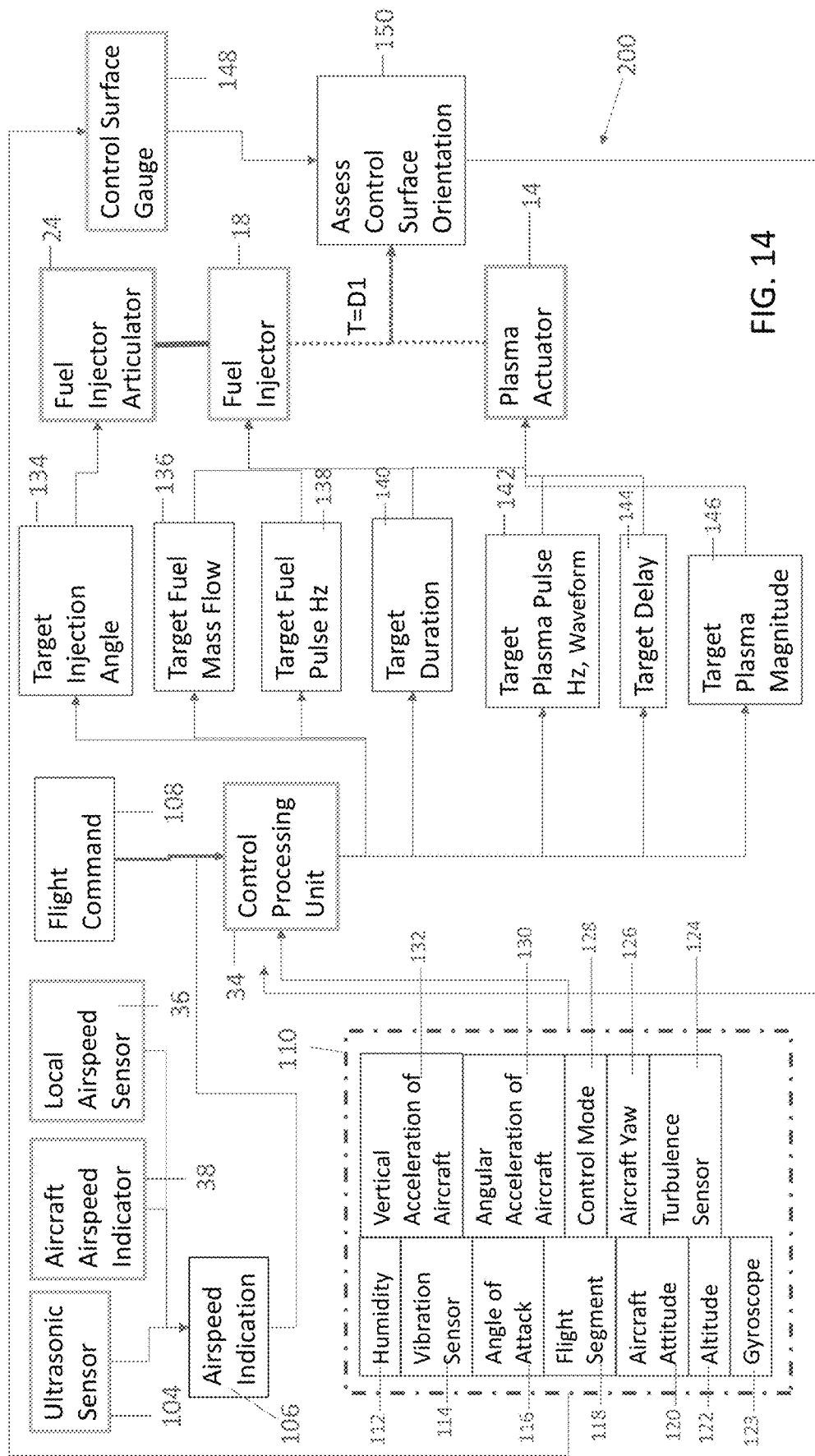
FIG. 14 is a schematic representation of a control system for a plasma-ignited combustion system.

FIG. 14 illustrates a control system 200 that may be used for controlling plasma-ignited combustion systems 10. The control system includes a control unit 34 that receives at least one airspeed indication 106 which may be from an ultrasonic sensor 104, the aircraft airspeed indicator 38, and/or the local airspeed indicator 36. The control unit 34 also receives inputs from at least one flight command 108 which may include commands such at various aircraft maneuvers or commands to stabilize flight due to turbulence or changing environmental and/or operational conditions. The control processing unit 34 may also receive input signals from a plurality of aircraft sensors and parameters 110 including, but not limited to, the ambient humidity 112, a vibration sensor 114, an angle of attack indication 116, a flight segment indication 118, an aircraft attitude 120, the aircraft altitude 122, a gyroscope 123, a turbulence sensor 124, an aircraft yaw indication 126, an aircraft control mode 128, an aircraft angular acceleration 130, and an aircraft vertical acceleration 132. The plurality of aircraft sensors and parameters 110 may be used by the control unit 34 to determine which actions to execute and the means for executing. For example, if excessive vibrations or turbulence are sensed, the control unit may activate one or more plasma-ignited combustion systems 10 to act with mitigating force on one or more control surfaces 12, the execution of which may depend on the altitude 122, angle of attack 116, vertical acceleration 132, and/or other factors.

Referring to still to FIG. 14, the control unit may determine a number of control target values including, but not limited to, a target injection angle 134 (i.e., the angle at which fuel is injected), a target fuel mass flow rate 135, a target fuel pulse rate 138, a target duration 140 (i.e., the time duration for which one or more plasma-ignited combustion systems 10 may be activated), a target plasma pulse rate and/or plasma waveform 142, a target delay 144 (i.e., the difference in time from when the fuel is injected to when plasma is generated based on the time of flight (or estimated time of flight) for the fuel to flow from the injection location 16 to the plasma location 26), and a target plasma magnitude 146. These target values may be transmitted to the fuel injector articulator 24, the fuel injector 18, and/or the plasma actuator 14, as shown in FIG. 14. After a period of time passes (T=D1, where D1 may be equal to a first delay, a second delay, etc. determined as a target delay 144 by the control processing unit 34), the control unit assesses the control surface orientation at 150, the determination of which may depend on inputs from one or more control surface gauges 148 which in turn may receive inputs from the plurality of aircraft sensors and parameters 110, for example an angle of attack 116 and/or an aircraft yaw 126. After the control system assesses the control surface orientation at 150, a signal may be sent back to the control processing unit 34 to determine if further action is required.

The control system 200 may also include other components that are not shown in FIG. 14 such as the fuel control valve 20 and the power source 30. In addition, the control system 200 may include communication connections not shown in FIG. 14. Components of the control system 200 operate at frequency ranges from about 1 Hz to about 1000 Hz. For example, the plasma actuator 14 and fuel injector 18 both may operate in a frequency range from about 1 Hz to about 200 Hz, or from about 10 Hz to 150 Hz, or from about 25 Hz to 100 Hz, to from about 50 Hz to 75 Hz. Other sensors of the control system 200 such as the plurality of aircraft sensors and parameters 110 as well as the airspeed indicator 38 and/or ultrasonic sensor 104 may operate in a range from about 50 Hz to about 1000 Hz. The control system 100 operates at frequency ranges that are equal to or higher than the system components, for example at ranges of about 200 Hz to about 1000 Hz. In some embodiments, the control system 100 operates at frequency ranges greater than 1000 Hz.

In operation, the plasma-ignited combustion systems and control system 200 of the present embodiments are used to balance thrust, horizontal accelerations, vertical accelerations and angular accelerations by providing restoring forces onto control surfaces 12 of aircraft and structures thereof. As illustrated in FIGS. 2-10 of the present embodiments, plasma-ignited combustion systems may be used on various surfaces of aircraft of different architectures and configurations including, but not limited to, subsonic, supersonic and hypersonic, and on structures thereof, including wings, engines, exhaust nozzles of supersonic engines, and elsewhere.

Figure 15:
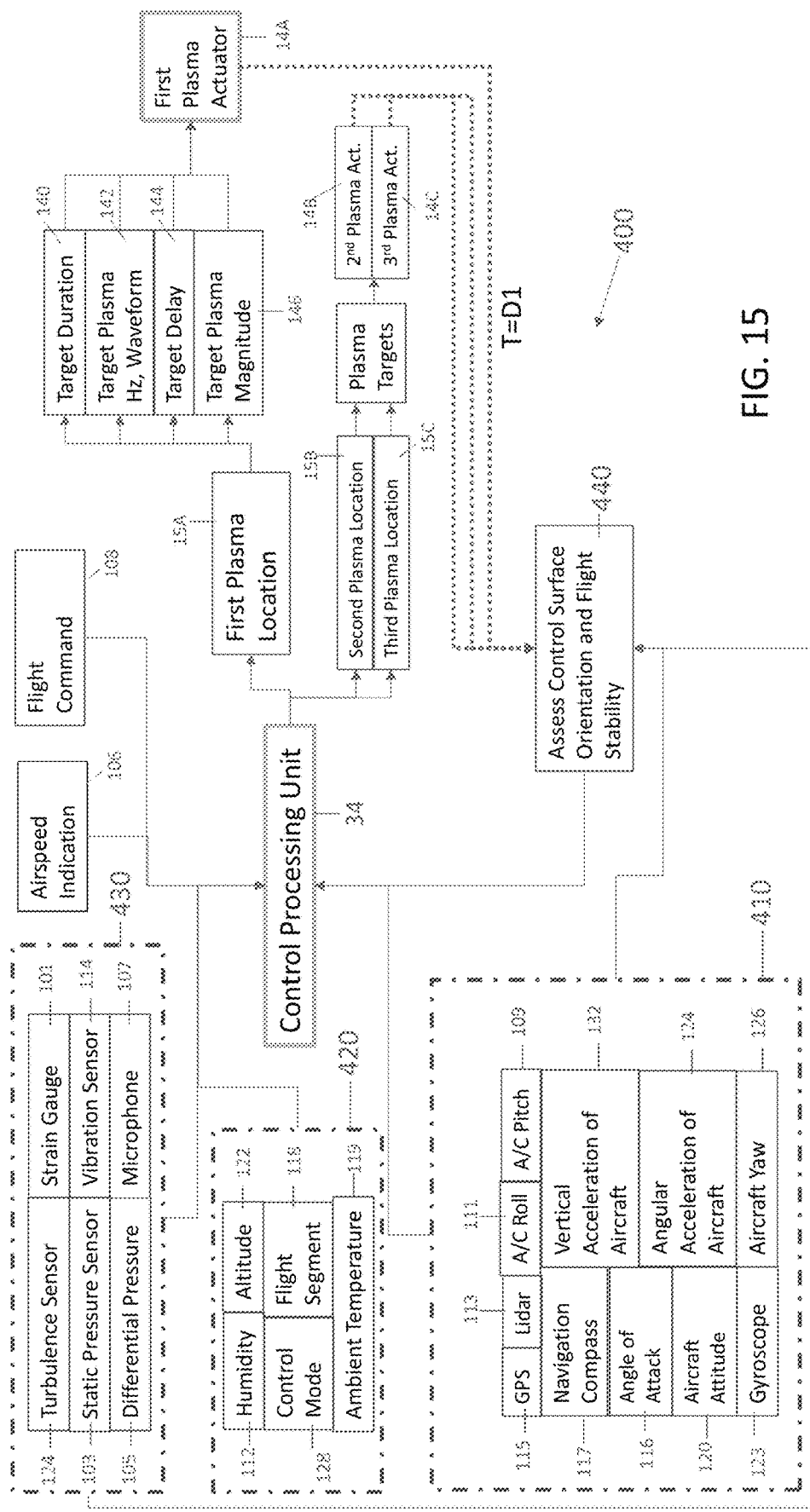
FIG. 15 is a schematic representation of a control system for a plasma-aided control system.

FIG. 15 illustrates a control system 400 that may be used for controlling hypersonic aircraft such as the second hypersonic aircraft 300 of FIGS. 11-13, as well as other supersonic and hypersonic aircraft such as those of FIGS. 7-10. The control system 400 includes a control processing unit 34 that receives at least one airspeed indication 106 which may be from an ultrasonic sensor 104 (not shown), the aircraft airspeed indicator 38 (not shown), and/or the local airspeed indicator 36 (not shown). The control unit 34 also receives inputs from at least one flight command 108 which may include commands such at various aircraft maneuvers or commands to stabilize flight due to turbulence or changing environmental and/or operational conditions. The control unit 34 may also receive input signals from a plurality of aircraft orientation sensors and parameters 410, including but not limited to: an angle of attack indication 116, an aircraft attitude 120, a gyroscope 123, an aircraft yaw indication 126, an aircraft angular acceleration 130, an aircraft pitch indication 109, an aircraft roll indication 111, a lidar sensor 113, a GPS sensor 115, a navigation compass 117, and an aircraft vertical acceleration 132. The plurality of aircraft orientation sensors and parameters 410 may be used by the control unit 34 to determine which actions to execute and the means for executing. For example, if the aircraft is drifting from a target control setting or orientation, or if a new heading is desired, the plurality of aircraft orientation sensors and parameters 410 may be used for determining, establishing, and/or reestablishing the new and/or desired heading.

Still referring to FIG. 15, the control system 400 may also include a plurality of flight stability sensors and parameters 430. The plurality of flight stability sensors and parameters 430 may transmit signals to the control processing unit 34 including, but not limited to: a turbulence sensor 124, a vibration sensor 114, a static pressure sensor 103, a differential pressure sensor and/or indication 105, a strain gauge 101, and a microphone 107, as well as other sensors and parameters. The plurality of flight stability sensors and parameters 430 may be used for characterizing various aerodynamic and acoustics aspects of flight, especially during supersonic flight. For example, the turbulence indicator 124 may indicate the presence of unsteady conditions, cross-winds and/or environmental disturbances; the static pressure sensor 103 and microphone 107 may be used to characterize the magnitude and frequency of shockwaves, as well as other characteristics such as the shockwave angle of incident and shockwave geometry; the differential pressure indication 105 may be used to assess different shockwave characteristics at different locations on the aircraft; a strain gauge 101 may be disposed on or within various control surfaces 12 of the aircraft in order to assess the magnitude, frequency and propagation patterns of shockwaves that act on various control surfaces 12 of the aircraft and thereby cause them to deflect and/or deform; and the vibration sensor 114 may be used to sense vibrations in the aircraft as well as surfaces and components thereof, in order to assess at least one flight characteristic such as shockwave frequency and/or shockwave magnitude.

Referring still to FIG. 15, the control system 400 may also include a plurality of aircraft control parameters 420 including but not limited to: the ambient humidity 112, a flight segment indication 118, ambient temperature 119 (and/or free-air temperature), the aircraft altitude 122, and an aircraft control mode 128, as well as other control parameters. Each of the parameter and/or sensor of the plurality of aircraft orientation sensors and parameters 410, the plurality of aircraft control parameters 420, and the plurality of flight stability sensors and parameters 430 may also be used in connection with other control modules and/or for other purposes than those shown in FIG. 15. For example, the aircraft altitude 122 may also be used for determining and/or establishing flight stability and/or aircraft orientation. In addition, and by way of non-limiting example, the aircraft altitude 122 may also be used to make corrections or adjustments to other parameters, as required.

Referring still to FIG. 15, the control processing unit 34, may use the airspeed indication 106 (which may include an indicated airspeed and/or a corrected or true airspeed) as an indication of the presence of shockwaves. For example, as the airspeed indication 106 signals that the aircraft is traveling at supersonic speeds, shockwaves would likely be presumed to be present, even in the absence of a direct shockwave measurement or indication from, for example, the plurality of flight stability sensors and parameters 430. The control processing unit 34 may or may not have an input from the flight command 108. For example, in situations where the desired heading and/or control mode includes maintaining the current heading, there may not be an input from the flight command 108, but the control processing unit 34 would continue to actively control the aircraft, for example, to maintain flight stability and aircraft orientation.

Still referring to FIG. 15, the control processing unit 34, based on the several inputs FIG. 15, and possibly others, determines plasma actuator targets for each of a first plasma location 15A, a second plasma location 15B, a third plasma location 15C, and any other plasma locations on the aircraft. For each plasma location of the plurality of plasma locations 15A-15C, the control processing unit 34 determines a target duration 140, a target plasma frequency, pulse rate and/or waveform 142, a target plasma delay 144 (and/or sequence timing, for example when a pattern or sequence for activating the plurality of plasma actuators 14 is desired), and a target plasma magnitude 146. Each of the determined plasma target values for the first plasma location 15A are then communicated to a first plasma actuator 14A, which in turn executes the desired target plasma actuation and/or routine. In FIG. 15, the target plasma values are only illustrated for the first plasma location 15A. However, the second plasma location 15B, the third plasma location 15C, and the fourth through $N^{th}$ plasma locations would also have target plasma values which are similarly communicated to the corresponding plasma actuator, 14B, 14C, etc. After a duration of time equal to a first duration (T=D1), the control system 400, at 440, assesses an orientation of at least one control surface 12, as well as at least one parameter representative of flight stability. The assessment of flight stability may be based, at least in part, on the plurality of flight stability sensors and parameters 430 while the assessment of control surface 12 and/or aircraft orientation may be based, at least in part, on the plurality of aircraft orientation sensors and parameters 410.

In operation, the plasma-aided control system 400 of FIG. 15 may operate at frequencies from about 500 Hz to about 50 kHz based on inputs from sensors which may operate at frequencies from tens of Hz to tens of megahertz. For example, the control system 400 may operate at about 5 kHz to about 15 kHz, executing the entire control scheme or portions and/or modules thereof about 5,000 times to about 15,000 times per second based on inputs from sensors with varying operating frequencies. In other embodiments, the control system 400 may operate at about 500 Hz to about 50 kHz. Some sensors may have a time lag due to, for example, the thermal lag associated with the time it takes for a temperature sensor to heat up or cool down. Other sensors, such as electronic GPS or Lidar sensors as well as others, may transmits and receive millions of signals per second. Some portions or modules of the control system 400 may operate at different frequencies than others. For example, the plurality of plasma actuators 14, which may be actuated thereby generating plasma based on an electrical input signal which can be modulated very quickly, may operate at higher frequencies to accommodate the high frequencies associated with continuously maintaining stable flight, due to continuously varying aerodynamic disturbances experienced at supersonic and hypersonic flight conditions. Stated otherwise, the control system 400 must operate at high enough frequencies to allow the system to react appropriately and swiftly, to maintain aircraft stability. In one embodiment, the plasma-aided control system 400 may receive at least one signal at the control processing unit 34 from the plurality of flight stability sensors and parameters 430 (the at least one signal indicative of at least one flight characteristic, for example a shockwave frequency and/or a shockwave magnitude), and command at least one plasma actuator to generate plasma in response to the signal and tailored to provide stable flight, in view of the at least one flight characteristic. For example, the control processing unit 34 may command at least one of the plurality of plasma actuators 14 to actuate with counteractive and/or stabilizing force commensurate in magnitude and frequency to the respective shockwave magnitude and frequency, as sensed by the plurality of flight stability sensors and parameters 430.

The control systems of FIGS. 14 and 15 may be used on subsonic, transonic, supersonic and hypersonic aircraft such as those illustrated in FIGS. 6-13. In addition, plasma-ignited combustion systems 10 and plasma-aided control systems 400 may be combined into a single system. For example, in supersonic flight conditions, when flight stability adjustments, and/or high frequency aircraft control adjustments are desired or required, plasma may be actuated alone, without fuel injection. In other embodiments, plasma may be used to ignite fuel when higher magnitude control adjustments are required and/or when various aircraft maneuvers are requested from flight command 108. Activation of the plasma actuators 14 alone without fuel injection may be possible at higher frequencies than plasma-ignited combustion. Fuel delivery systems onboard the aircraft for delivery of fuel to, for example, aircraft engines or as coolant for control systems, may be combined to the extent possible with the systems and components of the plasma-ignited combustion systems 10 (fuel supply 22, fuel control valve 20, fuel injectors 18, etc.).

Conventional aircraft may have moveable surfaces for thrust vectoring in the exhaust nozzle, and/or to be used as control surfaces. However, these mechanical systems are heavy and respond relatively slowly, (at about 25 Hz for conventional hydraulic actuators). In contrast, the plasma-ignited combustion systems and plasma-aided control systems of the present embodiments can instead be used on the external surfaces of the aircraft, such as on the wings and tails to provide control forces, without the need for moveable surfaces and associated systems. The plasma-ignited combustion systems and plasma-aided control systems of the present embodiments can also operate at much higher frequencies in the range of about 500 Hz to 15 kHz, thereby enabling stable hypersonic flight.

An advantage of the present embodiments is that they enable aircraft control at much higher speeds (100s of Hz as opposed to ~10 Hz), which may be necessary in the hypersonic regime. Also, the present embodiments would likely weigh less than traditional control surfaces, which would increase aircraft efficiency. The fuel injector 18 and plasma actuator 14 are synchronized so that each pulse and/or dispersal of fuel from the fuel injector 18 travels downstream to the plasma location 26 just as plasma has formed, thereby igniting the fuel. The synchronized activation of the fuel injector 18 and plasma actuator 14 may occur tens, hundreds, thousands, and even more times per second. For example, in some embodiments, the synchronized activation of the fuel injector 18 and plasma actuator 14 may occur in the 10 kHz operating regime. In other embodiments, the synchronized activation of the fuel injector 18 and plasma actuator 14 occurs between about 5 kHz and about 15 kHz. In other embodiments, the synchronized activation of the fuel injector 18 and plasma actuator 14 occurs between about 1 kHz and about 5 kHz. In other embodiments, the synchronized activation of the fuel injector 18 and plasma actuator 14 occurs between about 100 Hz and about 1 kHz. By using multiple fuel injector 18 and plasma actuator 14 pairs arranged at different locations and orientations on one or more control surfaces 12, and by activating different pairs at different times, aircraft can be controlled so as to account for overcompensation of one pair by causing a second pair to provide a restorative force.

Embodiments herein may improve combustion stabilization and enable plasma-stabilized combustion systems to be used for controlling aircraft (see U.S. application Ser. No. 15/979,217 assigned to General Electric Co. of Schenectady, N.Y.) with few or no moving parts. Embodiments herein may also be used on a leading edge, trailing edge and/or other surface of at least one fin of supersonic and/or hypersonic projectiles. For example, plasma actuators and systems similar to those of the preceding figures may be disposed along one or more leading edges of a fin of a hypersonic missile to control and/or stabilize the flight thereof.

Exemplary embodiments of a plasma-ignited combustion systems, plasma-aided control systems and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where supersonic combustion and/or supersonic aircraft controls are desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A combustion system comprising:
    at least one plasma actuator disposed along a substrate at a plasma location;
    at least one fuel injector disposed along the substrate at an injection location, the at least one fuel injector dispersing fuel toward the plasma location; and
    a fuel injector articulator communicatively coupled to the control processing unit and mechanically coupled to the fuel injector, wherein the fuel injector articulator adjusts the orientation of the fuel injector such that fuel flows from the fuel injector toward the plasma location,
    wherein plasma from the at least one plasma actuator ignites fuel from the fuel injector proximate the plasma location.

2. The combustion system of claim 1 further comprising:
    at least one flow surface adjacent the plasma location, the at least one flow surface transferring force resulting from the combusted fuel into the substrate.

3. The combustion system of claim 1, further comprising a fuel control valve, the fuel control valve in fluid communication with and upstream of the fuel injector.

4. The combustion system of claim 3, further comprising a fuel supply, the fuel supply in fluid communication with and upstream of the fuel control valve.

5. The combustion system of claim 4, further comprising a control processing unit, the control processing unit communicatively coupled to each of the fuel control valve, the fuel supply, the fuel injector, and the plasma actuator.

6. The combustion system of claim 5, further comprising an airspeed indicator communicatively coupled to the control processing unit, the airspeed indicator providing a signal representative of an airspeed across the substrate adjacent the injection location.

7. The combustion system of claim 6, wherein the airspeed indicator is disposed along the substrate in between the injection location and the plasma location.

8. The combustion system of claim 6, wherein the airspeed indicator measures an aircraft airspeed.

9. The combustion system of claim 6, wherein the control processing unit causes the plasma actuator to generate plasma at the plasma location just as fuel flows from the fuel injector arrives at the plasma location, and
    wherein the control processing unit synchronizes fuel flowing from the fuel injector with plasma generated by the plasma actuator at least partially based on a signal from the airspeed indicator.

10. The combustion system of claim 9, further comprising:
    at least one flow surface disposed adjacent the plasma location; and
    a power source,
    wherein the power source is electrically coupled to the plasma actuator,
    wherein the power source is communicatively coupled to the control unit, and
    wherein the airspeed indicator is disposed along the substrate in between the injection location and the plasma location.

11. The combustion system of claim 5 further comprising a power source,
    wherein the power source is electrically coupled to the plasma actuator, and
    wherein the power source is communicatively coupled to the control processing unit.

12. The combustion system of claim 5, wherein the control processing unit is communicatively coupled to an aircraft control system.

13. An aircraft comprising:
    at least one plasma actuator disposed along an aircraft control surface at a plasma location;
    at least one fuel injector disposed along the aircraft control surface at an injection location, the at least one fuel injector dispersing fuel toward the plasma location; and
    a fuel injector articulator communicatively coupled to the control processing unit and mechanically coupled to the fuel injector, wherein the fuel injector articulator adjusts the orientation of the fuel injector such that fuel flows from the fuel injector toward the plasma location,
    wherein plasma from the at least one plasma actuator ignites fuel from the fuel injector proximate the plasma location, and
    wherein the ignited fuel from the fuel injector acts with force on the aircraft control surface.

14. The aircraft of claim 13, wherein the aircraft control surface is an aircraft engine exhaust nozzle.

15. The aircraft of claim 13, wherein the aircraft is at least one of a subsonic aircraft, a supersonic aircraft and a hypersonic aircraft.

16. The aircraft of claim 13, wherein the aircraft control surface is an aircraft wing.

* * * * *